United States Patent
Weiss et al.

(10) Patent No.: US 6,786,313 B2
(45) Date of Patent: Sep. 7, 2004

(54) ROTATIONAL CONTROL APPARATUS

(75) Inventors: Kevin B. Weiss, Stillwater, MN (US);
Dave Hein, Oakdale, MN (US)

(73) Assignee: Nexen Group, Inc., Vadnais Heights, MN (US)

(*) Notice: Subject to any disclaimer, the term of this patent is extended or adjusted under 35 U.S.C. 154(b) by 0 days.

(21) Appl. No.: 10/062,246

(22) Filed: Feb. 4, 2002

(65) Prior Publication Data

US 2003/0146064 A1 Aug. 7, 2003

(51) Int. Cl.[7] .................... F16D 67/04; F16D 25/08
(52) U.S. Cl. .................... 192/18 A; 192/85 CA; 192/98; 192/110 B
(58) Field of Search ............. 192/85 CA, 98, 192/110 B, 14, 16, 18 A

(56) References Cited

U.S. PATENT DOCUMENTS

| | | |
|---|---|---|
| 1,527,798 A | 2/1925 | Hawley |
| 1,834,242 A | 12/1931 | Hollingsworth |
| 2,165,978 A | 7/1939 | Miller |
| 2,607,445 A | 8/1952 | Rausenberger |
| 2,698,676 A | 1/1955 | Eason |
| 2,957,564 A | 10/1960 | Peras ............... 192/53.364 |
| 3,000,470 A | 9/1961 | Milan |
| 3,159,247 A | 12/1964 | Charlton |
| 3,468,402 A | 9/1969 | Edwards |
| 3,500,970 A | 3/1970 | Schilling |
| 3,585,873 A | 6/1971 | Austen ............... 192/53.364 |
| 3,667,581 A | 6/1972 | Hanks |
| 3,695,407 A | 10/1972 | Peery |
| 3,805,935 A | 4/1974 | Armstrong |
| 3,860,100 A | 1/1975 | Spanke et al. ............ 192/18 A |
| 3,897,860 A | 8/1975 | Borck et al. |
| 3,921,775 A * | 11/1975 | Matyschik .................. 192/98 |
| 3,924,715 A | 12/1975 | Cory ...................... 192/18 A |
| 3,946,838 A | 3/1976 | Daniels, Sr. |
| 3,967,706 A | 7/1976 | King |
| 4,011,930 A | 3/1977 | Coons et al. |
| 4,078,637 A | 3/1978 | Hanks |
| 4,534,454 A * | 8/1985 | Brooks ..................... 192/18 A |
| 4,750,595 A * | 6/1988 | Dayen et al. ............. 192/18 A |
| 4,766,986 A | 8/1988 | Dayen et al. |
| 4,926,989 A | 5/1990 | Bruntz ..................... 192/18 A |
| 5,577,581 A | 11/1996 | Eberwein et al. .......... 192/18 A |
| 5,896,971 A * | 4/1999 | Hein ...................... 192/85 CA |

* cited by examiner

Primary Examiner—Richard M. Lorence
(74) Attorney, Agent, or Firm—Alan D. Kamrath; Nikolai & Merserau, P.A.

(57) ABSTRACT

A rotational control apparatus (10) includes multiple facings (274–276) rotatable with and axially slideable relative to a mount (124) and which sandwich multiple friction plates (252, 253) rotatable with and axially slideable relative to a hub (12). To create turbulent air flow, the friction plates (252, 253) include an undulating outer circumferential edge (258) and a plurality of passages (260) in the interface portion and overlapping the inner peripheries (282) of the facings (274–276). An automotive clutch release type bearing (290) directly abuts between a piston (40) and the friction facing (274) and is encapsulated in the piston cavity (36) and a cavity (277) formed in the friction facing (274), with the friction facing (274) engaging the axial end (34) of the air chamber (24) when the facings (274–276) and the friction plates (252, 253) are disengaged. In the preferred form, the air chamber (24) and the mount (124) are of the same geometry and are machined from identical castings.

20 Claims, 2 Drawing Sheets

ROTATIONAL CONTROL APPARATUS

BACKGROUND

The present invention generally relates to apparatus for controlling rotation of an output, with the output being selectively driven by an input or rotationally independent from the input and possibly rotatably related to a third member.

Clutches, clutch/brakes and other rotational control apparatus of various types and configurations are known in the art. Such apparatus typically allow free rotation in an unactuated position and can be pneumatically actuated. One type of such apparatus includes multi-plate friction interfaces due to their relatively small radial size and due to their relatively high torque.

However, there is always a need for improved rotational control apparatus which reduces complexity and/or which increases performance. It is desired that such improved rotational control apparatus be cost competitive with existing apparatus and/or may be aimed to somewhat specific applications such as in the preferred form to the conveyor clutch market.

SUMMARY

The present invention solves this need and other problems in the field of rotation control by providing, in the preferred form, an automotive clutch release type bearing between the piston and the interface element so that axial force can be applied directly through the bearing without the use of a thrust plate or thrust bearing, with the bearing being capable of being unloaded as well as being self-contained to simplify the design of the rotational control apparatus.

In a preferred aspect of the present invention, the piston and the bearing between the piston and the interface element are encapsulated in the interface and/or piston cavity to inhibit exposure of the bearing to friction dust, dirt or other environmental contaminants which could inhibit bearing performance.

In still further aspects of the present invention, the interface element in a nonactuated position engages the axial end of the air chamber to eliminate rotational speed differences therebetween such as for holding the output stationary when the air chamber is rotationally stationary.

In further aspects of the present invention, the friction plate axially slideable relative to but rotatable with the input creates turbulent air to increase air flow allowing for higher thermal dissipation. In preferred forms, the outer circumferential edge is not circular and includes lobes and depressions such as in the form of a sine wave. Additionally, a plurality of passages are formed in portions which interface with an interface element, with the plurality of passages being equally circumferentially spaced and of noncircular shapes in the most preferred form. The interface elements with which the friction plate interfaces include a circumferential edge located intermediate the maximum and minimum radial extents of the plurality of passages.

In other aspects of the present invention, the air chamber and the mount preferably forming the output of the rotational control apparatus have the same geometry allowing machining from identical castings. Thus, identical bearings can be utilized, the design can be simplified, and the capital and production costs can be minimized.

It is thus an object of the present invention to provide a novel apparatus for controlling rotation.

It is further an object of the present invention to provide such a novel rotational control apparatus of a simplified design reducing complexity.

It is further an object of the present invention to provide such a novel rotational control apparatus having increased performance.

It is further an object of the present invention to provide such a novel rotational control apparatus which is cost competitive.

It is further an object of the present invention to provide such a novel rotational control apparatus providing increased air flow to enhance thermal capacity.

It is further an object of the present invention to provide such a novel rotational control apparatus providing increased air flow to remove friction dust, dirt, and other contaminants.

It is further an object of the present invention to provide such a novel rotational control apparatus having reduced mass.

It is further an object of the present invention to provide such a novel rotational control apparatus allowing elimination of expensive heat treatments.

It is further an object of the present invention to provide such a novel rotational control apparatus reducing the number of different castings.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
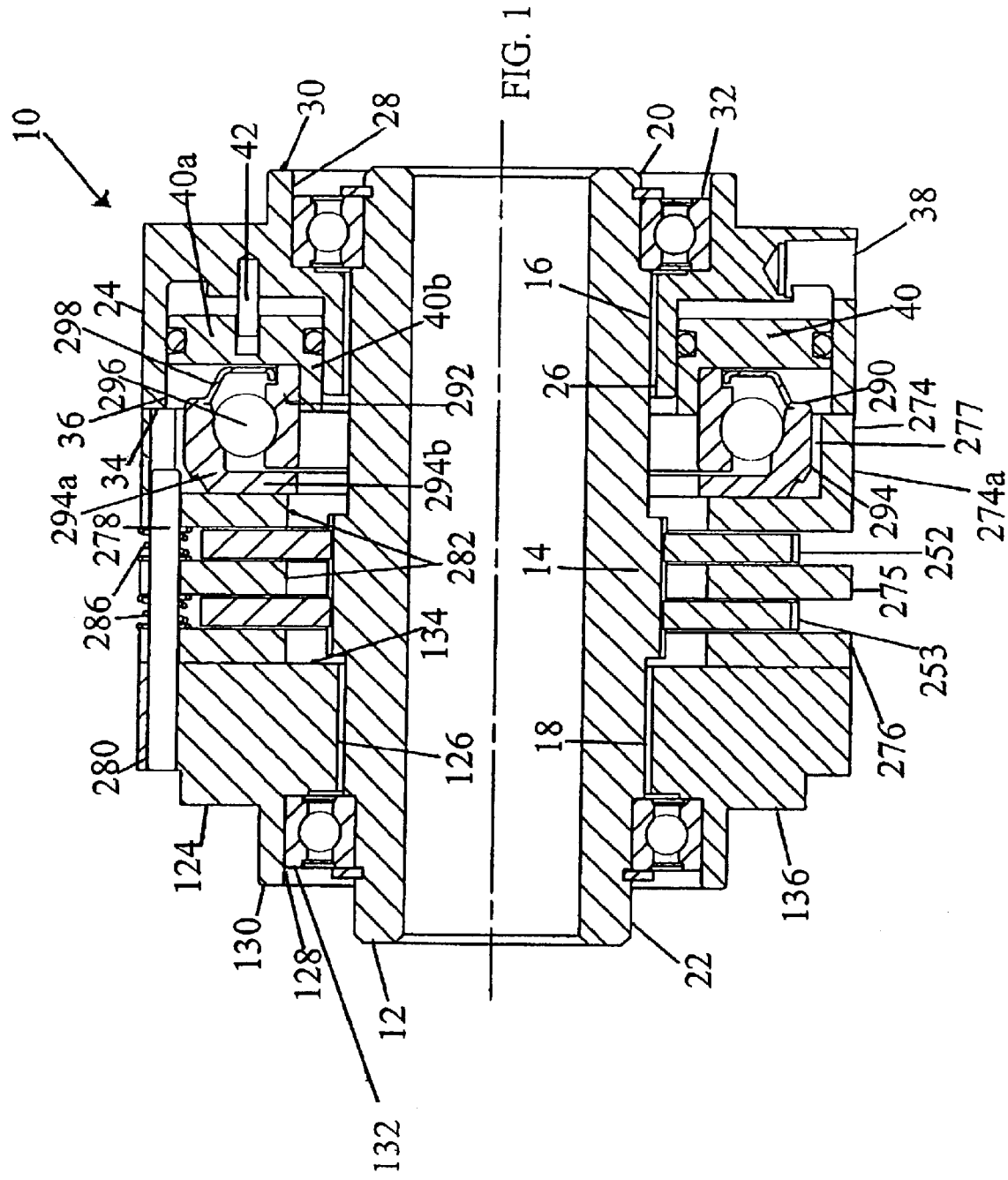
FIG. 1 shows a cross sectional view of a rotational control apparatus according to the preferred teachings of the present invention, with the cross section being along nondiametric radial directions to show different constructional components.
Figure 2:
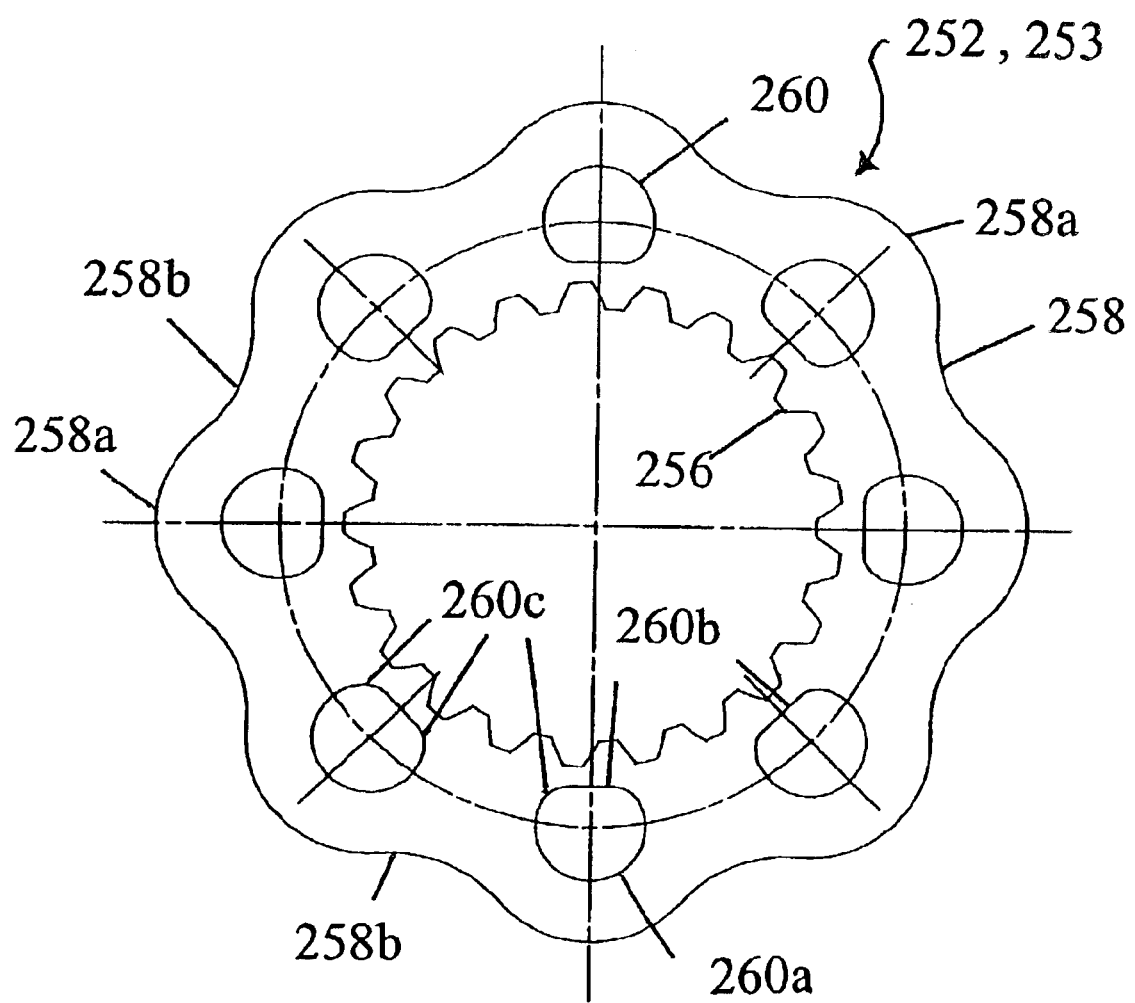
FIG. 2 shows a plan view of a friction plate utilized in the rotational control apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals, designate the same or similar parts. Furthermore, when the terms "axial", "radial", "first", "second", "side", "end", "inner", "outer" and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

A rotational control apparatus having particular application to conveyor applications according to the preferred teachings of the present invention is shown in the drawings and generally designated 10. In the most preferred form, apparatus 10 is shaft mounted and includes a first member in the form shown as a hub 12 rotatable about the apparatus axis. Hub 12 in the preferred form has a central splined portion 14, first and second lands 16 and 18 on opposite sides of portion 14, and first and second bearing surfaces 20 and 22 on opposite sides of lands 16 and 18. Lands 16 and 18 have generally equal diameters less than the maximum diameter of splined portion 14 and have generally equal axial lengths in the preferred form. Likewise, surfaces 20 and 22 in the preferred form have generally equal diameters less than the diameter of lands 16 and 18.

Apparatus 10 further includes a member rotatable relative to hub 12 in the form shown as a fixed air chamber 24 having an internal bore 26 and a counter bore 28 extending from one axial end 30. Air chamber 24 is rotatably mounted upon hub 12 by a bearing 32 located on bearing surface 20 and within counter bore 28. Bearing 32 is suitably axially fixed on hub 12 such as by being sandwiched between land 16 and a snap ring. Bore 26 has a diameter generally equal to but slightly greater than land 16 and an axial length from counter bore 28 to the opposite axial end 34 generally equal to or slightly shorter than land 16. Air chamber 24 includes an annular piston cavity 36 extending axially from end 34 towards but spaced from counter bore 28. Suitable provisions such as a radial inlet 38 extending from the radially outer surface of air chamber 24 and intersecting with cavity 36 is provided for introducing fluid pressure into cavity 36.

An annular piston 40 is mounted to and axially moveable relative to air chamber 24 by being slideably received in cavity 36 in the preferred form shown. In the preferred form, piston 40 has L-shaped cross sections and particularly includes a radially extending portion 40a having radially inner and outer surfaces for slideable receipt in the radially inner and outer surfaces of cavity 36. Piston 40 further includes an axially extending portion 40b having a radially inner surface corresponding to the radially inner surface of cavity 36 and having a radially outer surface spaced radially inward from the radially outer surface of cavity 36. Portion 40b extends axially beyond portion 40a. In the preferred form, suitable provisions are provided to prevent relative rotation but allowing axial movement between piston 40 and air chamber 24 such as an antirotation pin 42 pressed into air chamber 24 and slideably received in piston 40. Provisions provide a relatively fluid tight but slideable interconnection between piston 40 and cavity 36 such as O-rings in piston 40 in the preferred form.

Apparatus 10 further includes a member rotatable relative to hub 12 in the form shown as a rotatable mount 124 having an internal bore 126 and a counter bore 128 extending from one axial end 130. Mount 124 is rotatably mounted upon hub 12 by a bearing 132 located on bearing surface 22 and within counter bore 128. Bearing 132 is suitably axially fixed on hub 12 such as by being sandwiched between land 18 and a snap ring. Bore 126 has a diameter generally equal to but slightly greater than land 18 and an axial length from counter bore 128 to the opposite axial end 134 generally equal to or slightly shorter than land 18. End 130 of mount 124 includes provisions such as a pilot surface 136 for mounting to a rotatable object such as a sheave or similar drive element.

In the most preferred form, air chamber 24 and mount 124 have the same geometry so that they can be machined from the same casting or raw material. This also allows the use of identical bearings 32 and 132. The use of common components to increase component volumes and simplify design results in significant cost savings.

Apparatus 10 includes suitable provisions for providing a selective interface between hub 12 and mount 124 which can be of several varieties well known to persons skilled in the art. In the preferred form shown, apparatus 10 is of the multi-plate friction interface type which are known to provide maximum torque with a relatively small radial size. In particular, apparatus 10 includes a first set of interface elements constituted by first and second, metallic friction plates 252 and 253 which are axially slideable relative to but rotatable with hub 12. In the preferred form, each friction plate 252 and 253 has first and second planar axial surfaces and includes an inner opening 256 adapted to be axially slideable relative to but rotatable with hub 12 and in the most preferred form is splined for slideable receipt on splined portion 14 of hub 12. In the preferred form, each plate 252 and 253 has an undulating outer circumferential edge 258 extending between the opposite axial surfaces and of a generally sinusoidal shape and in the most preferred form having eight sinusoidal cycles around the circumferential edge 258. In particular, eight lobes 258a are defined between eight depressions 258b. In this regard, both lobes 258a and depressions 258b have smooth radiuses without straight sides to create a pulsating rather than a chopping effect when rotated. Likewise, edge 258 defines the outer radial extent of each plate 252 and 253 and is free of tabs, ears or other projections such as would be used for securement purposes.

In the preferred form, each plate 252 and 253 includes a plurality of passages 260 located intermediate opening 256 and edge 258, with eight passages 260 being provided in the most preferred form at equal circumferential spacing corresponding to the radial positions of lobes 258a, of the same size and shape, and having the same minimum and maximum radial extents which do not intersect or are in communication with opening 256 and edge 258. Passages 260 in the preferred form have continuous noncircular shapes perpendicular to the apparatus axis including an arcuate interior surface and without sharp corners and are of a constant size between the opposite axial surfaces of plate 252 and 253. In particular, each passage 260 includes a generally circular portion 260a extending generally 270° around the circumference, a flat radially inner portion 260b extending perpendicularly to the radial direction, and first and second arcuate interconnecting portions 260c between portions 260a and 260b. The radius of portions 260a is generally equal to one-fourth of the radial spacing between the maximum extents of passages 260 and edge 258, with the center of portions 260a located approximately three-fourths of the radial spacing of the maximum extent of edge 258 from the rotational axis of each plate 252 and 253. Passages 260 are generally concentric to lobes 258a for about 45° on opposite sides of a radial division line. It should be appreciated that although abutable with facings 274–276, plates 252 and 253 are not secured to any other component which would restrict air flow through passages 260.

Additionally, apparatus 10 of the preferred form includes a second set of interface elements constituted by first, second, and third friction interface facings 274, 275, and 276, which are axially slideable relative to but rotatable with mount 124. Plates 252 and 253 are axially between facings 274 and 275 and facings 275 and 276, respectively. Facings 274–276 are rotatable with but axially slideable relative to mount 124 by any suitable provisions which are well known in the art. In the preferred form shown, a plurality of pins 278 are press fitted in mount 124 and extend through openings 280 formed in facings 274–276. In the most preferred form, facings 274–276 include an inner periphery 282 of a radial size larger than hub 12 and intermediate the maximum and radial extents of passages 260 and in the preferred form having a diameter greater than the minimum radial extent of passages 260 and in the most preferred form generally equal to the radial extent of the centers of portions 260a. Thus, each of the first and second axial surfaces of plates 252 and 253 includes an interface portion which engages with facings 274–276, with passages 260 located in the interface portions of plates 252 and 253. In the preferred form, facing 274 includes an axially extending flange 274a away from facings 275 and 276 and plates 252 and 253 and thereby defines a cavity 277.

Apparatus 10 further includes provisions for separating plates 252 and 253 and/or facings 274–276. In the preferred form, coil springs 286 are located on pins 278 and intermediate facings 274 and 275 and facings 275 and 276. Pins 278 and springs 286 are located radially outward of plates 252 and 253 so that plates 252 and 253 are able to rotate relative thereto and intermediate facings 274–276. In the preferred form, facing 276 abuts with end 134 of mount 124.

Suitable provisions are provided to axially relate piston 40 with facing 274 but allowing relative rotational movement therebetween. Specifically, a bearing 290 is sandwiched between piston 40 and facing 274. In the most preferred form, bearing 290 is of the automotive clutch release type and includes an axially extending annular inner race 292 which in the preferred form can be received on and preferably pressed upon the radially outer surface of axially extending portion 40b. Annular outer race 294 of bearing 290 has generally L-shaped cross sections and includes an axially extending annular portion 294a extending generally parallel to but radially spaced outwardly from race 292. Outer race 294 of bearing 290 further includes a radially extending annular portion 294b extending from portion 294a and having a radially inner extent corresponding to that of inner race 292. In the form shown, piston 40 directly abuts with the second axial end of inner race 292, and facing 274 directly abuts with portion 294b of bearing 290 opposite to inner race 292. A plurality of balls 296 are provided intermediate inner race 292 and portion 294a of outer race 294 to allow relative rotation therebetween. A shield 298 extends between the free end of portion 294a and inner race 292 to thereby encapsulate balls 296 and any lubricant or friction reducing agent.

In operation and in the absence of fluid pressure to inlet 38, facings 274–276 are biased by springs 286 to be axially spaced from each other and specifically do not sandwich and can be axially separated from plates 252 and 253. Thus, plates 252 and 253 as well as hub 12 are rotatably independent from facings 274–276, pins 278, and mount 124, with air chamber 24 being rotationally independent from hub 12 by bearing 32 and from facing 274 by bearing 290 and with mount 124 being rotationally independent from hub 12 by bearing 132.

With the introduction of fluid pressure into inlet 38, piston 40 is axially forced outward of cavity 36 causing facings 274–276 to be axially slid on pins 278 against the bias of springs 286, with plates 252 and 253 engaging and being sandwiched between facings 274–276 and facings 274–276 being sandwiched between bearing 290 and end 134 of mount 124. In the absence of any slippage, when sandwiched together, plates 252 and 253 as well as hub 12 will rotate at the same rotational speed as facings 274–276, pins 278 and mount 124, with air chamber 24 being rotationally independent from hub 12 by bearing 32.

Now that the basic construction and operation of apparatus 10 according to the preferred teachings of the present invention have been set forth, the advantages of apparatus 10 can be highlighted. Specifically, the use of bearing 290 of the automotive clutch release type and specifically including outer race 294 allows direct pushing off of it axially by piston 40 and facing 274. Thus, it is possible to eliminate the requirement of a thrust plate between bearing 290 and facing 274 as is common in conventional clutches and even though facing 274 is not formed of metal. Specifically, facings 274–276 are constructed mainly of glass fibers bound with a matrix of phenolic resin and including modifiers like Kevlar and Carbon to fine tune for specific functional properties. Facings 274–276 are specifically designed to interface with ferrous metals (from which plates 252 and 253 are created) creating high friction coefficients with little wear to themselves and the components with which they interface. In this regard, previously thrust plates were replaced by thrust bearings which are deficient because they cannot be unloaded and are not self contained, with these problems not being present in bearing 290 which can be unloaded and is self contained. Thus, apparatus 10 according to the teachings of the present invention has fewer components because it does not require the thrust plate, is more axially compact, is of a simplified design, and is of a lighter weight.

In the preferred form, the combined axial extent of piston 40 and bearing 290 is generally equal to the axial extent of cavity 277 and/or piston cavity 36. This allows the piston 40 and bearing 290 to be generally located within cavity 277 and/or piston cavity 36 and thus be generally encapsulated in cavity 277 and/or piston cavity 36. This encapsulation of bearing 290 inhibits exposure of bearing 290 to dust, dirt, or other contaminants from the environment including but not limited to particles worn from plates 252 and 253 and/or facings 274–276. Such contaminants may have an adverse effect on the performance and life of bearing 290. Also, encapsulating bearing 290 in cavity 277 and/or piston cavity 36 also allows apparatus 10 to be axially compact, with the use of automotive clutch release type bearing 290 providing synergistic effects to minimize the axial extent of apparatus 10 of the most preferred form.

In the most preferred form, the combined axial extent of piston 40 and bearing 290 is equal to or less than the axial extent of cavity 277 and/or piston cavity 36 and end 34 of air chamber 24 is axially spaced from end 134 of mount 124 in an amount that springs 286 are in partial compression when facing 274 abuts with end 34 of air chamber 24 and facing 276 abuts with end 134 of mount 124. Although contact of facing 274 with end 34 would be minimal, as only the outer edge of flange 274a of facing 274 would engage end 34, such contact would create a braking torque as facing 274 would frictionally interface with end 34 to attempt to eliminate rotational speed differences therebetween, with the rotational speed of air chamber 24 being zero or stationary in the preferred form shown. It should be realized that air chamber 24 could include an anchor, fastener or other provisions to insure that air chamber 24 is held stationary for providing the braking surface and to prevent breaking of any fluid connections to inlet 38. This feature may be especially helpful in applications where it is desired to hold mount 124 stationary and any rotatable object mounted thereto in a stopped condition, in providing an emergency stop, or is slowing rotation of mount 124 and any rotatable object mounted thereto more quickly when fluid pressure is released. To enhance this effect, end 34 of air chamber 24 could include a friction facing or other surface which functionally interfaces with facing 274. It should be appreciated that the use of automotive clutch release type bearings 290 provides synergistic effects to minimize the axial extent of piston 40 and bearing 290 and thus of cavity 277 and/or piston cavity 36 and of air chamber 24 while still allowing this braking feature. Although facing 274 includes axially extending cavity 277 to receive portion 294b of bearing 290 to thereby reduce the required axial extent of piston cavity 36 in the preferred form, facing 274 could be formed of planar stock and of an identical configuration as facings 275 and 276 and still allow this braking feature if piston cavity 36 by itself is of the required axial extent.

Although axially extending openings through interface discs are known to allow removal of half moon friction lining rings as shown in U.S. Pat. Nos. 4,078,637 and 4,766,986, plates 252 and 253 of the most preferred form are advantageous for a variety of reasons. The noncircular shape of edge 258 including lobes 258a and depressions 258b and the presence of passages 260 and their overlapping relation with friction facings 274–276 create turbulent air as plates 252 and 253 rotate with hub 12 which in typical applications will be in a steady state rotating condition. This turbulent air increases air flow allowing for higher thermal dissipation. This turbulent air also moves friction dust, dirt and other contaminants away from the interfacing surfaces of plates 252 and 253 and facings 274–276, with passages 260 located radially inward of facings 274–276 being especially important to create turbulence inside of apparatus 10 to expel contaminants away from the splines of splined portion 14 and inner opening 256. Such contaminants could impair interface performance. Likewise, the removal of material especially to form passages 260 but also to form depressions 258b reduces the mass of plates 252 and 253 which also significantly reduces the mass moment of inertia and thereby allows for easier start-ups with less impact. Additionally, plates 252 and 253 of the most preferred form is resistant to warpage when expanding and contracting from temperature. This resistance to warpage is important for interface performance but can be a cost savings as well as expensive heat treatments may be eliminated.

Now that the basic teachings of the present invention have been explained, many extensions and variations will be obvious to one having ordinary skill in the art. For example, although apparatus 10 of the most preferred form includes the combination of several, unique features believed to obtain synergistic results, rotational control apparatus could be constructed according to the teachings of the present invention including such features singly or in other combinations.

Similarly, it would be obvious to persons skilled in the art to reverse components. As an example, bearing 290 could be arranged such that portion 294b abuts with piston 40 and inner race 292 abuts with facing 274. Likewise, races 292 and 294 could be reversed such that portion 294a is received on the radially outer surface of portion 40b and/or portion 40b could extend to have a radially outer surface corresponding to the radially outer surface of cavity 36.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for providing rotational control comprising, in combination: a first member; a second member; a third member, with the first, second and third members being rotatable relative to each other about an axis; a first interface element axially slideable relative to but rotatable with the first member; a second interface element rotatable with the second member; a piston mounted to and axially moveable relative to the third member; a bearing including first and second races, with the first race extending axially and including first and second axial ends, with the second race having L-shaped cross sections including an axially extending annular portion extending generally parallel to but radially spaced from the first race, with the second race further including a radially extending annular portion extending from the axially extending annular portion and having a radially inner extent corresponding to the first axial end of the first race, with the bearing further including a plurality of balls located between the first race and the axially extending annular portion of the second race, with the second axial end of the first race abutting with one of the piston and the first interface element and the radially extending annular portion abutting with the other of the piston and the first interface element, with the piston being movable from a disengaged position where the first and second interface elements are allowed to be axially separated to an engaged condition with the piston through the bearing moving the first interface element to engage the second interface element with axial forces being applied directly through the bearing.

2. The rotational control apparatus of claim 1 with the second interface element being axially slideable relative to the second member and being in the form of a plate having first and second planar axial surfaces, an inner opening, and an outer circumferential edge, with the first and second axial surfaces including an interface portion which interfaces with the first interface element, with the plate including a plurality of passages extending between the first and second axial surfaces, with the plurality of passages located intermediate the inner opening and the outer circumferential edge and in the interface portion, with the plurality of passages having continuous shapes without sharp corners and without communicating with the inner opening and the outer circumferential edge for creating turbulent air flow.

3. The rotational control apparatus of claim 2 with the plurality of passages arranged to have maximum and minimum radial extents, with the first interface element having a circumferential edge at a radial spacing from the axis and intermediate the maximum and minimum radial extents of the plurality of passages.

4. The rotational control apparatus of claim 3 with the plurality of passages having equal circumferential spacing, being of the same size, and having the same maximum and minimum radial extents.

5. The rotational control apparatus of claim 4 with the outer circumferential edge including an undulating shape having a plurality of lobes and depressions, with each of the plurality of passages corresponding to a radial position of different lobes.

6. The rotational control apparatus of claim 1 with the piston having L-shaped cross sections and including a radially extending portion and an axially extending portion, with the bearing being received on the axially extending portion and abutting with the radially extending portion.

7. The rotational control apparatus of claim 1 with the third member including a piston cavity extending axially from an axial end of the third member and for receipt of the piston and the bearing for encapsulating the piston and the bearing therein.

8. The rotational control apparatus of claim 7 with the first interface element engaging with the axial end of the third member when the piston is in the disengaged position.

9. The rotational control apparatus of claim 7 wherein the first and third members have the same geometry allowing machining from identical castings.

10. The rotational control apparatus of claim 9 with the first and third members including internal bores of equal sizes and counter bores of equal sizes, with the rotational control apparatus further comprising first and second rotational bearings of identical size, with the first rotational bearing received in the counter bore of the first member and on the second member and the second rotational bearing received in the counter bore of the third member and on the second member and for rotatably mounting the first and third members on the second member.

11. The rotational control apparatus of claim 10 with the second member being in the form of a hub, with the second interface element being splined to the hub.

12. The rotational control apparatus of claim 1 with the second interface element being axially slideable relative to the second member and being in the form of a plate having first and second planar axial surfaces and an undulating radially outer circumferential edge having a plurality of lobes and depressions.

13. Apparatus for providing rotational control comprising, in combination: a first member; a second member; a third member, with the first, second and third members being rotatable relative to each other about an axis; a first interface element axially slideable relative to but rotatable with the first member; a second interface element rotatable with the second member; a piston mounted to and axially moveable relative to an axial end of the third member; a bearing located intermediate the piston and the first interface element, with the piston being movable from a disengaged position where the first and second interface elements are allowed to be axially separated to an engaged condition where the first and second interface elements are engaged, with the first interface element engaging with the axial end of the third member when the piston is in the disengaged position.

14. The rotational control apparatus of claim 13 with the first interface element including a flange extending axially away from the second interface element, with the flange engaging with the axial end of the third member when the piston is in the disengaged position.

15. The rotational control apparatus of claim 14 with the third member including a piston cavity extending axially from the axial end of the third member and for receipt of the piston and the bearing for encapsulating the piston and the bearing therein.

16. The rotational control apparatus of claim 13 with the first and third members including internal bores of equal sizes and counter bores of equal sizes, with the rotational control apparatus further comprising first and second rotational bearings of identical size, with the first rotational bearing received in the counter bore of the first member and on the second member and the second rotational bearing received in the counter bore of the third member and on the second member and for rotatably mounting the first and third members on the second member.

17. The rotational control apparatus of claim 16 with the second interface element being separate from and axially slideable relative to the second member.

18. The rotational control apparatus of claim 17 with the second interface element being in the form of a plate having first and second planar axial surfaces, an inner opening, and an outer circumferential edge, with the first and second axial surfaces including an interface portion which interfaces with the first interface element, with the plate including a plurality of passages extending between the first and second axial surfaces, with the plurality of passages located intermediate the inner opening and the outer circumferential edge and in the interface portion, with the plurality of passages having continuous shapes without sharp corners and without communicating with the inner opening and the outer circumferential edge for creating turbulent air flow.

19. The rotational control apparatus of claim 18 with the plurality of passages arranged to have maximum and minimum radial extents, with the first interface element having a circumferential edge at a radial spacing from the axis and intermediate the maximum and minimum radial extents of the plurality of passages.

20. The rotational control apparatus of claim 17 with the second interface element being in the form of a plate having first and second planar axial surfaces and an undulating radially outer circumferential edge having a plurality of lobes and depressions.

* * * * *